United States Patent [19]

Romano

[11] Patent Number: 4,922,786
[45] Date of Patent: May 8, 1990

[54] DEVICE FOR PREVENTING THE ROTATION OF A BICYCLE PEDAL RELATIVE TO ITS PIN

[75] Inventor: Antonio Romano, Padova, Italy
[73] Assignee: Campagnolo S.r.l., Vicenza, Italy
[21] Appl. No.: 323,540
[22] Filed: Mar. 14, 1989
[30] Foreign Application Priority Data Mar. 14, 1988 [IT] Italy ............... 67212 A/88

[51] Int. Cl.⁵ .............................................. G05G 1/14
[52] U.S. Cl. ................... 74/594.4; 74/594.6
[58] Field of Search ............... 74/594.1–594.6; 36/131, 132; 188/24.11, 1.12, 29, 74

[56] References Cited

U.S. PATENT DOCUMENTS

| | | | |
|---|---|---|---|
| 2,544,471 | 3/1951 | Rither | 188/74 |
| 4,103,563 | 8/1978 | Genzling | 74/594.5 |
| 4,244,239 | 1/1981 | Campagnolo | 74/594.6 X |
| 4,794,817 | 1/1989 | Romano | 74/594.6 |

FOREIGN PATENT DOCUMENTS

| | | | |
|---|---|---|---|
| 121309 | 11/1900 | Fed. Rep. of Germany | 74/594.4 |
| 065898 | 3/1956 | France | 188/24.11 |
| 88/09534 | 12/1988 | PCT Int'l Appl. | 74/594.4 |

Primary Examiner—Vinh T. Luong
Attorney, Agent, or Firm—Sughrue, Mion, Zinn, Macpeak & Seas

[57] ABSTRACT

A device for preventing the rotation of a bicycle pedal relative to its pin comprises a locking element carried by the pedal and movable, as a result of the engagement of the cyclist's shoe on the pedal, from a position of engagement with the pin, towards which the locking element is biassed by a resilient spring, to a release position in which the pedal is free to rotate relative to the pin. The locking element is guided for linear sliding in the body of the pedal between the engagement and release positions.

3 Claims, 1 Drawing Sheet

DEVICE FOR PREVENTING THE ROTATION OF A BICYCLE PEDAL RELATIVE TO ITS PIN

BACKGROUND OF THE INVENTION

The present invention relates to a device for preventing the rotation of a bicycle pedal relative to its pin, comprising a locking element carried by the pedal and movable—as a result of the engagement of the cyclist's shoe on the pedal—from a position of engagement with the pin, towards which the locking element is biassed by resilient means, to a release position in which the pedal is free to rotate relative to the pin.

A device of the type indicated above is described and illustrated in the utility model application No. 22476-B/86 by the same Applicant. Devices of this type are used to make it easier for the cyclist to clamp his shoe to the pedal. In particular, when the pedal is not engaged by the shoe, these devices cause the pedal to remain oriented relative to its pin in the most convenient position for the insertion of the shoe. This arrangement is particularly useful in pedals for sports bicycles, which are generally unbalanced relative to the axes of their pins and therefore assume positions in which they are rotated from operative positions when they are not engaged by the cyclist's shoes. In the case of the device previously proposed by the Applicant, the element for locking the pedal on the pin is constituted by a lever or rocker arm which is pivotably mounted on the pedal of the pin.

SUMMARY OF THE INVENTION

The object of the present invention is to produce a device of the type indicated above, which is even simpler and more functional than the known device.

The main characteristic by which the device according to the invention differs from that previously proposed lies in the fact that the locking element is guided for linear sliding in the body of the pedal between the two engagement and release positions.

In a preferred embodiment, the locking element comprises an active portion for engaging the pin and a guide portion mounted for sliding in a seat formed in the body of the pedal. The resilient means for biassing the locking element towards the engaged position are interposed between the body of the pedal and the guide portion. In the engaged position, the guide portion has one end which projects beyond the upper surface of the pedal. Thus, when the cyclist's shoe is placed on this surface of the pedal, the locking element is moved away from its locking position against the action of the resilient means.

In one particular embodiment, the locking element is constituted by a circular-sectioned bar having a portion mounted for sliding in a cylindrical hole which passes through the body of the pedal in a direction substantially perpendicular to the support surface for the shoe and a portion which projects beneath the body of the pedal for engaging the pin.

BRIEF DESCRIPTION OF THE DRAWINGS

Further characteristics and advantages of the present invention will become clear from the detailed description which follows with reference to the appended drawings, provided by way of non-limiting example, in which.

DETAILED DESCRIPTION OF THE INVENTION

Figure 2:
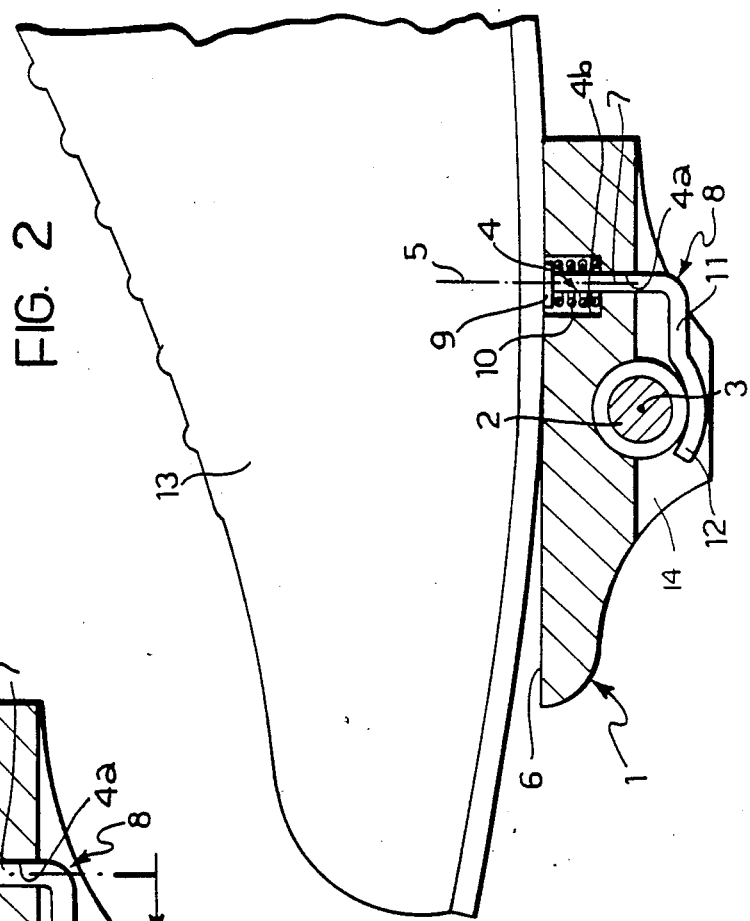
FIG. 2 shows a section which corresponds to that of FIG. 1 and shows the pedal engaged by the cyclist's shoe.

With reference to the drawings, a bicycle pedal, indicated 1, is rotatably mounted by means of rolling bearings (not illustrated) on a pin 2 having an axis 3. The structural details of the pedal are not described and illustrated in the present application, since the structure of the pedal may be of any known type and, in any case, does not fall within the scope of the present invention. Moreover, the elimination of details from the drawings makes the latter easier to understand.

A cylindrical hole 4 passes through the body 1 and has an axis 5 which is substantially perpendicular to the support surface 6 for the cyclist's shoe. The hole 4 has a smaller-diameter lower section 4a and a larger-diameter upper section 4b. A portion 7 of a locking element 8 is guided for sliding in the section 4a and, in the embodiment illustrated, is constituted by a generally L-shaped metal bar of circular section. The portion 7 has an upper end provided with a head 9. A helical spring 10 is interposed between the head 9 and the base of the larger-diameter section 4b of the hole 4.

The locking element 8 includes a portion 11 which projects beneath the body of the pedal and has a curved end portion 12 the concavity of which faces towards the pin 2.

Figure 1:
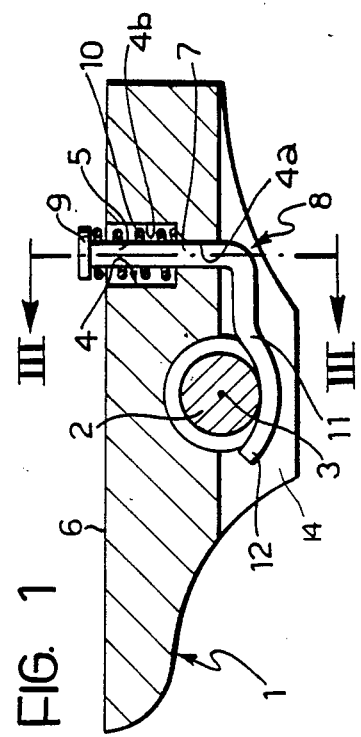
FIG. 1 is a schematic section of a pedal provided with a device according to the invention.
Figure 3:
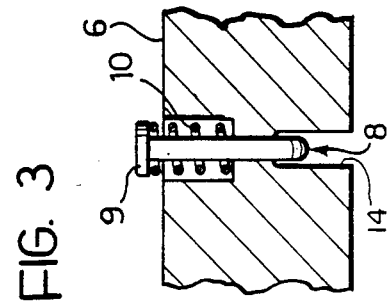
FIG. 3 is a section taken on the line III—III of FIG. 1.

The helical spring 10 keeps the locking element 8 in the engaged position shown in FIG. 1, in which the part 12 is in contact with the pin 2 and therefore prevents the rotation of the body 1 of the pedal relative to the pin 2. Consequently, when the pedal is not engaged by the cyclist's shoe, it can be left oriented in the position which is easiest for the engagement of the shoe on the pedal. In this condition, the head 9 of the locking element 8 projects above the support surface 6 for the shoe. Therefore, when the pedal is engaged by the shoe 13 (FIG. 2), the head 9 is pushed downwards and the locking element 8 is moved, against the action of the spring 10, into the release position shown in FIG. 2, in which the pedal is free to rotate relative to its pin so as to enable normal pedalling.

The active portion 11 of the locking element is arranged in a slot 14 with parallel walls formed in the lower part of the body of the pedal, in a plane normal to the axis of the pin of the pedal. The guide hole 4a opens into the slot 13. The latter thus prevents the rotation of the element 8 about the axis 5. Alternatively, a prismatic sliding coupling may be provided between the element 8 and hold 4a.

Naturally, the principle of the invention remaining the same, the forms of embodiment and details of construction may be varied widely with respect to those described and illustrated purely by way of example, without thereby departing from the scope of the present invention.

What is claimed is:

1. A device for preventing the rotation of a bicycle pedal relative to a pin on which said pedal is rotatably mounted wherein said pedal is provided with an upper portion defining a shoe supporting surface and a lower portion, a guide hole extending through said body in a direction substantially perpendicular to said shoe supporting surface and a slot located in said lower portion of said pedal intersecting said hole and said pin;

a locking element comprised of a bar having a first portion slidably guided in said hole and a second portion located in said slot to prevent rotation of said first portion in said hole and adapted to be moved into and out of locking engagement with said pin; and resilient means normally biasing said locking means in a direction in said hole wherein said first portion protrudes from said hole beyond said shoe supporting surface and said second portion is disposed in locking engagement with said pin, said first portion of said locking element being adapted to be engaged by a cyclist shoe to move said locking element against said resilient means to disengage said second portion of said locking element from said pin to permit free rotation of said pedal on said pin.

2. A device according to claim 1, wherein said first portion of said locking element is provided with a head adapted to project above said shoe supporting surface of said pedal and said resilient means is comprised of a helical spring interposed between said upper portion of said pedal and said head.

3. A device according to claim 1, wherein said bar has a generally L-shaped configuration with said second portion having a curved end portion defining a concave face adapted to engage said pin.

* * * * *